Oct. 1, 1935.       W. A. DEL MAR         2,015,714
                         CABLE
                    Filed May 9, 1933
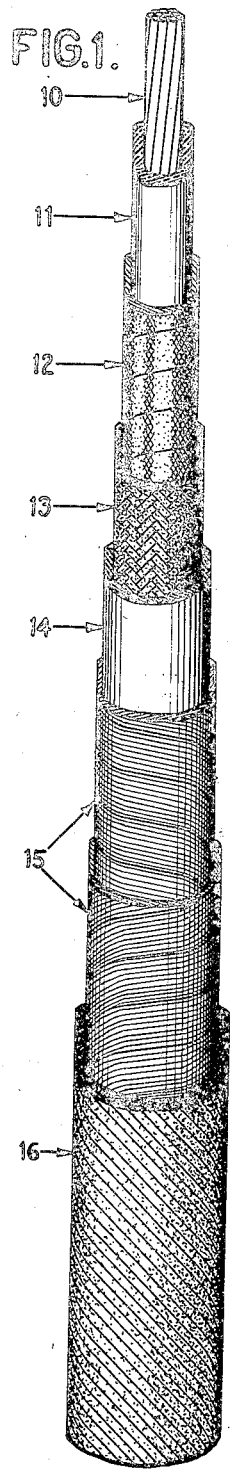
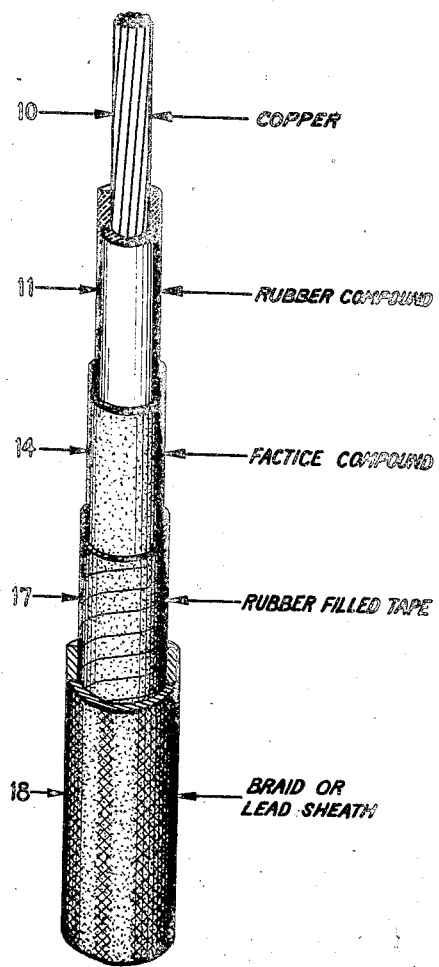
INVENTOR
William A. Del Mar
BY
Cooper, Kerr & Dunham
ATTORNEYS Patented Oct. 1, 1935

2,015,714

UNITED STATES PATENT OFFICE 2,015,714

CABLE

William A. Del Mar, Greenwich, Conn., assignor to Habirshaw Cable & Wire Corporation, New York, N. Y., a corporation of New York Application May 9, 1933, Serial No. 670,050

16 Claims. (Cl. 173—264)

This invention relates to electrical cables and more particularly to protective coverings for insulated electrical conductors. Electrical conductors, particularly when used underground, must be covered with some kind of waterproof envelope in order to protect the insulating material from contact with water or moisture. It is well known that rubber, which is frequently used as insulating material, is not entirely impervious to the passage of water so that rubber and rubber compounds while being excellent insulators need themselves to be protected from water. Two types of protective covers have been used, one constituting a lead sheath, which, when the cable is to be laid directly in the ground, must be protected by an armor sheet or steel wrapping because of its softness and pliability. The lead sheath is effective in keeping out water but is expensive and subject to deterioration by electrolysis and vibration and, being a conductor, the use of the lead sheath promotes eddy currents as well as provides a ready ground for short-circuits when pierced. The other covering used to protect rubber insulation consists of one or more layers of fabric and waterproofing compound. This latter type of covering has not been entirely satisfactory, especially when water is present in considerable quantities. Furthermore, even though there is but a small amount of moisture present the fabric itself is likely to absorb moisture and the fabric and waterproofing compound is likely to be ruptured when the cable is bent with the result that water may gain easy access to the insulation.

In view of the failure of full performance required of known forms of cables when buried in the ground in direct contact with earth, as is the customary practice in street and park lighting, much study has been expended in efforts to find a solution of the problem involved. As the answer to the problem I provide, as the aim of my invention, a cable in which the rubber insulation is protected from moisture, without defects incident to cables in which lead sheaths or saturated fabric envelopes are relied upon for the same purpose. To this end I provide a novel cable having a sheath of moisture repellent material which may not become water-logged and which is suitably protected by layers of shock absorbing and abrasion or wear resisting materials.

In the art of electrical insulation high dielectric strength characteristics of the insulation are frequently desirable but rubber compounds which have such characteristics are generally quite susceptible to rapid deterioration under the influence of ozone. Low specific inductive capacity characteristics are also obtainable by the use of certain kinds of rubber insulation known to those skilled in the art, but such rubber insulating materials are likewise generally subject to rapid deterioration under the influence of ozone. The effect of the ozone on rubber insulating material is to embrittle the rubber so that it easily cracks.

Accordingly, another object of the present invention resides in the provision of an insulated conductor having rubber insulation of high dielectric strength characteristics and including a protective layer of a material having high ozone resistant charteristics.

Another object of the present invention resides in the provision of an insulated conductor having rubber insulation with low specific inductive capacity characteristics and provided with a protective layer having high ozone resistant characteristics.

Further and other objects of the present invenion will be hereinafter set forth in the accompanying specification and claims and shown in the drawing which show by way of illustration preferred embodiments and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawing:

Figure 1 shows one embodiment of a cable incorporating the improvements of the present invention with layers of the material cut away so as to show the various materials of the cable in elevation and section; and Fig. 2 shows another and simpler embodiment of the invention wherein no fibrous material is used directly overlying the rubber insulation.

In practicing my invention where waterproof characteristics of a cable are particularly desired, the cable may be of the general form shown in Fig. 1. It matters not what form the core 10 may take and it may be made up of a plurality of groups of wires. It is the usual practice to cover the individual conductors of the core with electrical insulating material 11 such as rubber, and whether rubber or a compound thereof or varnished cambric or other insulating material is used, my invention is applicable since such materials must be protected from moisture in order to obviate undesirable consequences. When exposed to water for a long time even rubber becomes water-logged thereby deleteriously affecting its insulating properties and the same is true of other insulators.

Naturally, in the manufacture of cables the enveloping layers of material are applied over the inner layers and it is common practice to back-up or protect the insulation material 11 by one or more layers of fabric braid suitably weatherproofed. For use with my invention in such capacity I provide a layer 12 of rubberized cotton tape and a layer 13 of cotton braid.

For rendering water inaccessible to the core and other material of the cable thus far described, I provide a sheath of water resisting material 14 consisting of vulcanized oil. While this sheath may be applied by surrounding the enclosed core and materials with a sheet of the vulcanized oil and forming the sheath as pressure is applied to contacting edges, I prefer to form the sheath without a seam by extruding the same as the enveloped part of the cable is passed through a die.

I have found that a small amount of rubber, preferably not more than 20%, may be mixed with the vulcanized oil and that mechanical characteristics of the rubber may then be availed of without objectionably introducing the hygroscopic property of rubber desired to be obviated. The thickness of the layer of vulcanized oil which I have found to be satisfactory is about seven thousandths of an inch for an ordinary parkway cable, and in keeping with the variability of the number of layers and thicknesses of other materials in a cable, the thickness of the vulcanized oil sheath may be appropriately adapted.

As a shock absorber and for protecting the sheath of vulcanized oil two or more layers of oiled and wrinkled paper 15 is suitable. This paper may be wrapped about the vulcanized oil sheath 14 and adjacent layers preferably should be wrapped in opposite directions. Whatever be the character of the shock absorbing layer it should possess the ability to prevent deep penetration therein such as might occur during laying operations when stony soil is tamped about the cable.

For the purpose of resisting abrasion an asphalted jute covering 16 may be used.

A cable waterproofed by the sheath of vulcanized oil and in which the sheath of vulcanized oil is suitably protected has been found to withstand the rigors of use and to maintain the innermost layers of material and core free from moisture under most adverse conditions.

Those versed in the technology of manufactured oils will understand the character of vulcanized oil which I have found to be admirably suited for the purposes described. The vulcanized oil, also known as gomme factice, faktis or factice, which I use is brown and gummy and may be made by heating oils with sulphur to 160° C. In the United States considerable quantities of brown vulcanized oils are made from corn oil by heating fifty parts of oil to 470° F. and mixing with it about twenty parts of molten sulphur.

Factice is generally made by pouring molten sulphur into hot vegetable oil, the temperature of the oil being kept below the distillation point. The mass is then stirred until a thorough chemical combination has been attained. There are various kinds of factice, depending upon the kind and proportions of oil used. A kind suitable for the purposes of the present invention where higher resistance to moisture and ozone is desirable may be made with a mixture of cotton seed oil, rape seed oil and linseed oil. Corn oil may also be used in place of either of these oils. The various oils may be in equal proportions but the proportions may be varied to alter the physical properties. The oil and sulphur compound is usually mixed with from 15 to 25% of black hydrocarbon of the type known as "mineral rubber" and the heating is continued until evolution of gas has stopped. When cooled the resultant mass is a soft rubber-like material which may be manipulated like rubber, especially if mixed with a small proportion of rubber to augment its tensile strength. Such material will have not only high waterproof characteristics but will have high resistance to deterioration under the influence of ozone.

In certain cases, depending upon the conditions of use and the results desired, the cable structure shown in Fig. 1 may omit either the layer 12 or the layer 13 or both. Likewise the thickness of the factice layer or sheath 14 may be varied, for example in certain cases a thickness of fifty thousandths of an inch may be preferred. A tape of rubberized cotton may be provided over the vulcanized oil sheath. Also jute may be used for this shock absorbing layer.

Referring to Fig. 2 there is disclosed a simpler embodiment of the invention wherein 10 is the conductor which is covered with insulation, comprising a layer of rubber compound 11 disposed directly over the conductor. This rubber compound may be of such characteristics that it has high dielectric strength, low specific inductive capacity or both of these characteristics. Overlying the rubber compound 11 there is provided a protective layer of factice compound 14. The factice compound is not only water-resistant but it is also highly resistant to ozone and this layer prevents ozone reaching and attacking the layer of rubber compound 11. While the factice compound is itself of low dielectric strength as compared with rubber and of high specific inductive capacity, this is immaterial since these characteristics are provided by the underlying layer of rubber insulation, particularly as the thickness of the factice compound may be only a fraction of the thickness of the rubber insulation. Overlying the layer of factice compound there is a wrapping 17 which may be of rubberized tape and overlying the rubberized tape there may be an overlying jacket 18 which for some conductors may be in the form of a cotton braid or a serving of asphalted jute and which for other uses may be in the form of the customary lead sheath.

While in the above description a single conductor cable has been referred to, it is obvious that the same may be incorporated in multiple conductor cables.

In making up a factice compound which is to be used for a protecting sheath which is to be best resistant to ozone usually a greater proportion of rubber is used than in a compound used in a sheath which is to have the best water resistant characteristics. Such increased proportion of rubber is provided to give the material the desired tensile strength. A typical and preferred composition providing the best ozone resistant characteristics may be made as follows:

| | |
|---|---:|
| Factice | 60 |
| Rubber | 23 |
| Mineral matter | 15 |
| Organic matter | 2 |
| Total | 100 |

In the foregoing compound the vulcanized oil predominates in proportions over any other ingredient.

Cables and insulated conductors for high voltage service must have not only high dielectric strength, but also must be highly resistant to the effects of ozone, since ozone is formed around high voltage circuits by the action of electric stresses in the atmosphere. By disregarding the ozone resistance characteristics and water absorbing qualities of the rubber compound it is possible to provide a rubber compound which has the maximum properties of high dielectric strength or low specific inductive capacity as desired for the particular use to which the cable or insulated conductor is to be put. The use of the factice compound sheath which is placed over the rubber compound will then provide the desirable qualities which have been deliberately sacrificed in the rubber insulation itself, viz. resistance to deterioration under the influence of ozone or moisture. Accordingly, a cable of unprecedently high quality for high voltage service or a cable for waterproof service may be obtained.

The present application constitutes a continuation in part of my copending application, Serial No. 408,714, filed November 21, 1929.

What I claim is:

1. An insulated electrical cable provided with water absorbent rubber insulation and having disposed exteriorly to said rubber insulation a protective moisture resistant sheath which includes factice as its predominating ingredient.

2. An electrical cable for use in wet places comprising a conductor, water absorbent insulating material thereover, and a water resistant sheath exterior thereto, said sheath being composed of vulcanized oil such as factice as its principal constituent.

3. An insulated electrical cable having the usual water absorbent insulation and having exterior to said insulation a sheath which is comprised of vulcanized oil and other ingredients with the vulcanized oil predominating in proportions over the other ingredients, said other ingredients being in such small proportions relatively to the vulcanized oil as not to essentially impair the waterproofing qualities of the vulcanized oil.

4. An electrical cable comprising a core, insulating material for said core, and moisture resisting material exterior to the insulating material protecting said core and the insulating material from access by moisture, said moisture resisting material comprising over 50% of vulcanized oil.

5. An electrical cable comprising a core, insulating material for said core, a layer of moisture resisting material exterior to the insulating material including as its principal constituent vulcanized oil, a shock absorbing layer of material protecting the vulcanized oil from impact, and armor covering for counteracting abrasive wear.

6. An electrical cable comprising a core, insulating material for said core, a layer of moisture resisting material exterior to the insulating material comprising vulcanized oil and rubber compounded together with the vulcanized oil predominating over the rubber in said material, and protective material for said moisture resisting material.

7. An electrical cable, comprising a core, insulating material for said core, a layer of moisture resisting compound upon and exterior to said insulating material and including vulcanized oil in an amount not less than 80%, and protective layers of paper and jute.

8. An electrical cable comprising a core, insulating material therearound, a layer of moisture resisting compound exterior to the insulating material, said compound including vulcanized oil in amount of not less than 80% of the compound and one or more protecting coverings outside of said layer of compound comprising jute.

9. An insulated electrical cable having a conductor provided with rubber insulation of high dielectric strength and having disposed exterior to said insulation a protective sheath of ozone resisting material which comprises vulcanized oil as its predominating ingredient.

10. An electrical cable for use in an atmosphere containing ozone, comprising a conductor, ozone susceptible insulating material thereover and an ozone resistant sheath exterior thereto, said sheath being composed essentially of vulcanized oil.

11. An insulated electrical cable having an inner sheath of rubber insulation, a protective sheath for the rubber insulation exterior to said inner rubber sheath comprised of vulcanized oil and other ingredients, with the vulcanized oil predominating in proportions over the other ingredients.

12. An electrical cable comprising a core, insulating material for said core with high dielectric strength characteristics, but susceptible to ozone, and ozone resistant material exterior to said insulating material, protecting said insulating material from access by ozone, said ozone resistant material comprising vulcanized oil and other ingredients with the vulcanized oil predominating in proportions over any other ingredient.

13. An electrical cable comprising a core, insulating material for said core, having high dielectric strength characteristics, but susceptible to deterioration under the influence of ozone, a layer of ozone resistant material exterior to the insulating material, comprising vulcanized oil and rubber compounded together with the vulcanized oil predominating over the rubber in said material.

14. An electrical cable having the usual conductor with rubber insulating material therearound and a sheath comprised of a compound in which factice is the predominating material for providing protection to the aforesaid rubber insulating material.

15. An electrical cable comprising a core, insulating material for said core, having low specific inductive capacity characteristics but susceptible to deterioration under the influence of ozone, a layer of ozone resistant material exterior to the insulating material, comprising vulcanized oil and rubber compounded together with the vulcanized oil predominating over the rubber in said material.

16. An insulated electrical cable having an inner sheath of rubber insulation, a moisture and ozone resisting sheath for the rubber insulation exterior to said inner rubber sheath comprised of vulcanized oil and other ingredients, with the vulcanized oil predominating in proportions over the other ingredients, said other ingredients being in such small proportions relatively to the vulcanized oil as not to essentially impair either the moisture or ozone resisting qualities of the vulcanized oil.

WILLIAM A. DEL MAR.